2,926,348

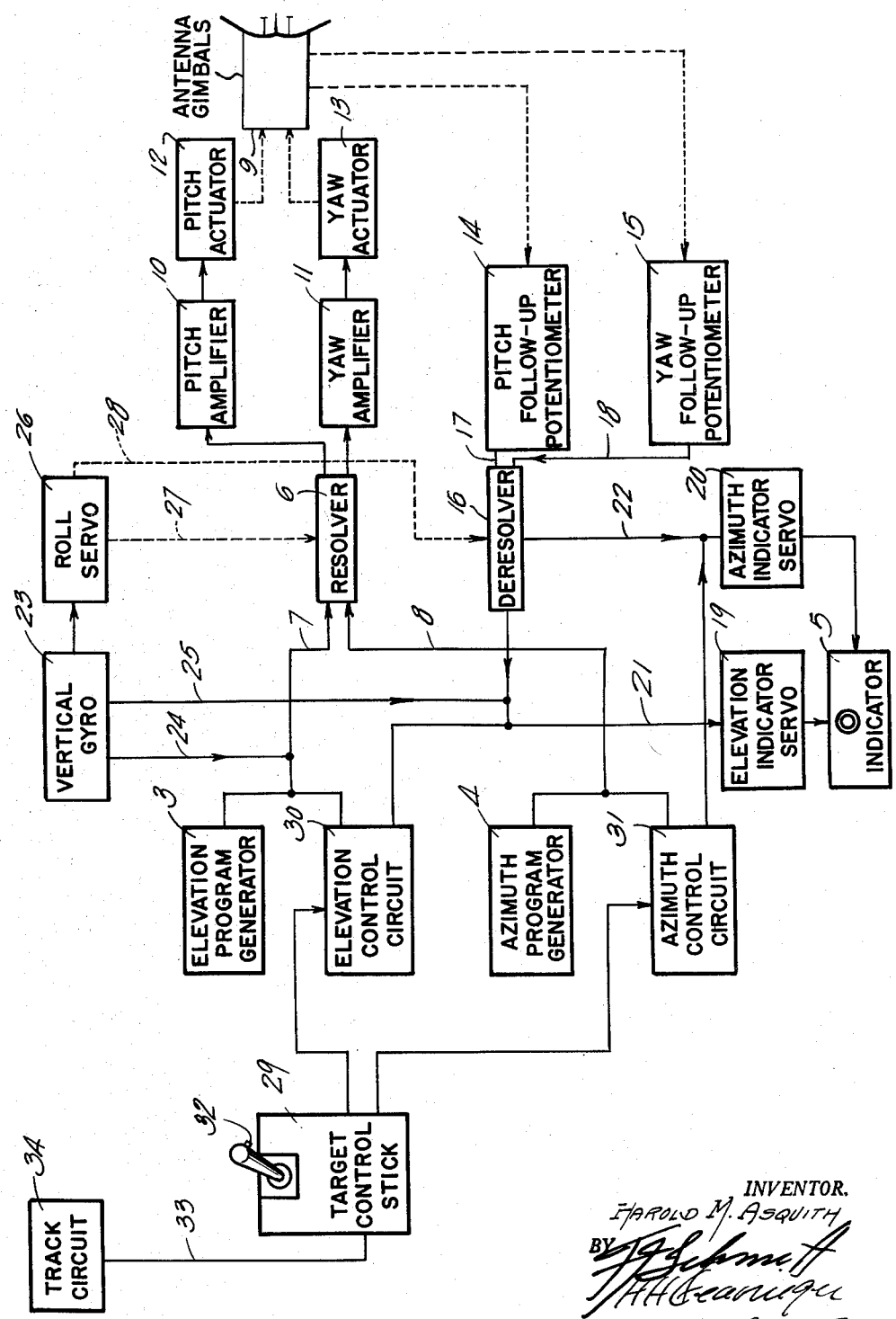

RADAR SEARCH STABILIZATION SYSTEM

Harold M. Asquith, Hyde Park, Mass., assignor, by mesne assignments, to the United States of America as represented by the Secretary of the Navy Application August 31, 1955, Serial No. 531,849

1 Claim. (Cl. 343—7.4)

The present invention relates to airborne interception radar apparatus and more particularly to novel and improved apparatus for selecting a predetermined target and causing the radar tracking circuits to lock on and follow the same.

Various types of radar equipment for interceptor type aircraft have in the past been designed to supply target range, relative velocity, and bearing and other information to a computer for gun laying purposes and for intercept control. Such apparatus, however, is ordinarily substantially limited in its ability to select and acquire a target by the motion of the ownship. Although various types of apparatus have also been designed and used in the past to reduce the effect of the motion of the ownship by stabilizing the search pattern of the radar system during the target selection and acquisition operation, considerable difficulty has been experienced heretofore in providing suitable apparatus of this kind which is efficient and reliable in operation and relatively simple in design and construction.

It is a principal object of the present invention to provide novel and improved apparatus for selecting and acquiring a target for an intercept-type radar system.

It is a further object of the present invention to provide novel and improved apparatus for selecting and capturing a target for an intercept-type radar system wherein the human error and the effect of motion of the ownship is minimized.

Other objects and many of the attendant advantages of this invention will be readily appreciated as the same becomes better understood by reference to the following detailed description when considered in connection with the accompanying drawings wherein the single figure of the drawing is a diagrammatic view of a preferred embodiment of the present invention.

In general the improved target selection apparatus of the present invention includes a radar antenna system, means for stabilizing the antenna system, a manual device for positioning the antenna system such that the preselected target is centered in the sector of search, and means for de-energizing the radar search circuit and energizing its track circuit when the target is centered in the sector of search. It has been found that selection and acquisition of a target on airborne intercept radar gear may be accomplished readily and effectively in this manner.

A preferred embodiment of the present invention is illustrated in the figure of the drawing. As shown therein, the elevation and azimuth program generators or the like 3 and 4, which as will be more apparent hereinafter ultimately control and define the basic sector of search on the screen of the radar indicator 5, are electrically connected to the resolver 6 through conductors 7 and 8. The pitch and yaw output voltage circuits of the resolver 6 are respectively connected to the gimbals 9 of the antenna system through the pitch and yaw amplifiers 10 and 11 and the pitch and yaw actuators 12 and 13. As will be more apparent hereinafter the gimbals 9 are adapted to move the antenna system in the pitch and yaw directions but preferably possess no roll function. The pitch and yaw followup potentiometers 14 and 15 which are also connected to the gimbals 9 of the antenna system and follow changes in the angular disposition thereof, are connected to the deresolver 16 through conductors 17 and 18. The deresolver elevation and azimuth output voltage circuits are respectively connected to the elevation and azimuth indicator servo mechanisms 19 and 20 and the indicator 5 through conductors 21 and 22.

The out-of-phase output circuits of the vertical automatic pilot type gyro 23 are respectively connected through conductors 24 and 25 to the input of the resolver 6 and the output of the deresolver 16. The roll output of the vertical gyro 23 is fed through the roll servo 26 and respectively through the mechanical interconnections 27 and 28 to the resolver 6 and the deresolver 16.

The target control stick or lever 29 which as will be more apparent hereinafter is preferably manually controlled by the pilot or operator of the intercept aircraft, is coupled as shown in any suitable manner to the elevation and azimuth control circuits 30 and 31. The out-of-phase output voltages of the elevation control circuit 30 are respectively connected to the elevation input channel of the resolver 6 and the elevation output channel of the deresolver 16. Similarly the out-of-phase output voltages of the azimuth control circuit 31 are respectively connected to the azimuth input channel of the resolver 6 and the azimuth output channel of the deresolver 16. The switch button 32 positioned on the control stick 29 is connected through conductor 33 to the track circuit 34 of the radar apparatus and as will be more apparent hereinafter is adapted to provide a manual means for discontinuing the search operation and initiating the tracking operation.

In operation when the aircraft flies in a horizontal plane, the resolver 6 is oriented in the aircraft such that energization of the pitch amplifier 10 and the pitch actuator 12 are exclusively controlled by the elevation program generator 3 and energization of the yaw amplifier 11 and the yaw actuator 13 are exclusively controlled by the azimuth program generator 4. The actuators 12 and 13 then control movement of the antenna on its gimbals 9 such that it sweeps the desired sector of search.

When the aircraft begins to pitch, an electrical signal proportional to the magnitude of the pitch angle is developed in the vertical gyro 23. This signal is fed thruogh conductor 24 to the input of the resolver 6 where it is combined with the output signal of the elevation program generator 3. In this way, the magnitude of the signal of the elevation program generator is adjusted in proportion to the pitch of the aircraft and the sector of search scanned by the antenna is pitch stabilized.

When the aircraft begins to roll, a signal proportional to the magnitude of the roll angle is developed in the gyro 23 and is fed through the roll servo 26 which mechanically rotates the resolver 6 in a direction opposite the roll of the aircraft. In this way, the antenna is roll stabilized even though the gimbals of the antenna system possess no roll function.

Signals from the follow-up potentiometers 14 and 15 are developed in accordance with the actual movement of the antenna about its pitch and yaw axes. These signals are then adjusted by the output of the roll servo 26 in the deresolver 16 and by the vertical gyro 23 through conductor 25 in a manner similar to that described above to provide pitch and roll stabilization of the raster on the screen of the indicator 5.

The pilot or operator then by properly moving the radar control stick 29 shifts the effective center of the sector of search of the antenna system until a preselected target coincides with the same. This is accomplished by superimposing the out-of-phase voltages from the elevation and azimuth control circuits 30 and 31 upon the input circuits for the resolver 6 and the output circuits for the deresolver 16. When the preselected target has been centered in the sector of search, the pilot or operator then depresses the control-stick button 32 to discontinue the searching operation and initiate a new program which will drive the antenna system in a circular motion about the target and lock on it.

Obviously many modifications and variations of the present invention are possible in the light of the above teachings. It is therefore to be understood that within the scope of the appended claims the invention may be practiced otherwise than as specifically described.

What is claimed is:

In an aircraft apparatus for locking radar tracking gear upon a preselected target said apparatus comprising an elevation program generator; an azimuth program generator; a resolver responsive to output signals of the elevation and azimuth program generators; pitch and yaw amplifiers coupled to the output of the resolver; pitch and yaw actuators respectively coupled to the outputs of the pitch and yaw amplifiers; an antenna system, which is movable in the pitch and yaw directions, coupled to the actuators; pitch and yaw follow-up potentiometers which are coupled to the antenna system and follow changes in the angular disposition thereof; a deresolver coupled to the output of the follow-up potentiometers; elevation and azimuth indicator servos connected to the output of the deresolver; an indicator coupled to the indicator servos; a vertically oriented gyro, said gyro providing a signal responsive to change in roll of the aircraft; means for superimposing the gyro pitch signal upon the elevation program generator output signal; a roll servo responsive to the gyro roll signal for controlling the rotary position of the resolver; manual means for developing and controlling reference voltages which are superimposed upon the output signals of the elevation and azimuth program generators; and means for deenergizing the elevation and azimuth program generators and energizing the tracking gear when the target assumes a predetermined position on the indicator.

References Cited in the file of this patent

UNITED STATES PATENTS

| | | |
|---|---|---|
| 2,426,658 | Wooldridge | Sept. 2, 1947 |
| 2,486,781 | Gittens | Nov. 1, 1949 |
| 2,589,813 | Hulsizer | Mar. 18, 1952 |
| 2,617,982 | Holschuh et al. | Nov. 11, 1952 |

OTHER REFERENCES

M.I.T. Radiation Laboratory Series, vol. 26, "Radar Scanners and Radomes," 1948. pp. 123–126.